United States Patent
Wagner et al.

(10) Patent No.: US 9,910,895 B2
(45) Date of Patent: Mar. 6, 2018

(54) PUSH SUBSCRIPTIONS

(71) Applicant: Apple Inc., Cupertino, CA (US)

(72) Inventors: Richard F. Wagner, San Francisco, CA (US); James H. Callender, San Francisco, CA (US); Nicholas K. Puz, Campbell, CA (US); Derrick S. Huhn, San Francisco, CA (US); Jeremy M. Werner, Burlingame, CA (US); Amol V. Pattekar, San Jose, CA (US); Olivier Bonnet, Mountain View, CA (US); Paul A. Seligman, San Francisco, CA (US); Kenneth B. McNeil, San Jose, CA (US)

(73) Assignee: Apple Inc., Cupertino, CA (US)

( * ) Notice: Subject to any disclaimer, the term of this patent is extended or adjusted under 35 U.S.C. 154(b) by 525 days.

(21) Appl. No.: 13/913,074

(22) Filed: Jun. 7, 2013

(65) Prior Publication Data
US 2014/0365523 A1 Dec. 11, 2014

(51) Int. Cl.
*G06F 17/00* (2006.01)
*G06F 17/30* (2006.01)

(52) U.S. Cl.
CPC .... *G06F 17/3051* (2013.01); *G06F 17/30029* (2013.01); *G06F 17/30864* (2013.01)

(58) Field of Classification Search
CPC ........... G06F 17/3051; G06F 17/30864; G06F 17/30029
USPC .................................................. 707/702, 770
See application file for complete search history.

(56) References Cited

U.S. PATENT DOCUMENTS

| | | | | |
|---|---|---|---|---|
| 5,813,004 A | * | 9/1998 | Meck | G06F 7/22 707/702 |
| 6,532,285 B1 | * | 3/2003 | Tucker | H04M 3/4217 379/201.01 |
| 6,591,266 B1 | * | 7/2003 | Li | G06F 17/30902 707/E17.12 |
| 6,618,822 B1 | * | 9/2003 | Loaiza | G06F 17/30368 707/999.202 |
| 7,617,254 B2 | * | 11/2009 | Loaiza | G06F 17/30368 707/999.003 |
| 9,317,546 B2 | * | 4/2016 | Anderson | G06F 17/30138 |
| 2003/0200194 A1 | * | 10/2003 | Arnold | G06F 17/3048 707/999.001 |
| 2006/0036941 A1 | * | 2/2006 | Neil | G06F 9/4443 715/234 |
| 2011/0041140 A1 | | 2/2011 | Harm et al. | |

(Continued)

*Primary Examiner* — Phong H Nguyen
(74) *Attorney, Agent, or Firm* — Downey Brand LLP

(57) ABSTRACT

Techniques are disclosed for delivering push subscription notifications in large scale distributed systems. Subscription notifications can be delivered to mobile devices of subscribing users by monitoring, at a server, an application database comprising a data record having one or more data values, detecting, at the server, in accordance with the monitoring, a changed data value, querying a subscription database for a subscription having at least one constant value to be compared to the changed data value in accordance with a trigger condition specified in a trigger template, determining whether the trigger condition is true using the changed data value and the constant value as the values of the first and second variables, respectively, in the at least one comparison; and pushing a notification from the server in response to the trigger condition being true.

20 Claims, 6 Drawing Sheets

(56) References Cited

U.S. PATENT DOCUMENTS

| | | | |
|---|---|---|---|
| 2011/0179015 A1* | 7/2011 | Balebail | G06F 17/30418 |
| | | | 707/720 |
| 2011/0307500 A1* | 12/2011 | Li | H04L 67/24 |
| | | | 707/755 |
| 2012/0054107 A1* | 3/2012 | Biswas | G06F 21/10 |
| | | | 705/53 |
| 2012/0096114 A1 | 4/2012 | McColgan et al. | |
| 2012/0102153 A1* | 4/2012 | Kemp | G06F 17/3051 |
| | | | 709/219 |
| 2012/0174171 A1* | 7/2012 | Bouchard | H04N 21/25858 |
| | | | 725/100 |
| 2012/0209907 A1 | 8/2012 | Andrews et al. | |
| 2013/0085804 A1 | 4/2013 | Leff et al. | |
| 2013/0166332 A1* | 6/2013 | Hammad | G06Q 40/10 |
| | | | 705/5 |
| 2014/0181887 A1* | 6/2014 | Moon | H04N 21/23617 |
| | | | 725/133 |

\* cited by examiner

PUSH SUBSCRIPTIONS

TECHNICAL FIELD

The present invention relates generally to communication of information among entities in computer systems. More particularly, the present embodiments relate to simplifying communication of notifications between entities in distributed computer systems.

BACKGROUND

Computer programs are often designed to perform certain tasks when specific events or conditions occur. For example, when a weather forecasting service determines that rain is likely later in the day, the forecasting service can send a notification message to weather applications located on mobile computing devices via a wireless communication network. The mobile weather applications are not necessarily executing or even loaded in memory at the time the notification message is sent, so applications rely on other software modules, such as the device operating system that can receive and process incoming notifications in a timely manner. The operating system can pass the notifications to the applications associated with the notifications, e.g., to the weather application for notifications sent by the weather service. If an application is not executing when a notification is received, the operating system can bring the application into an executing state in which the application can process the notification. The operating system can then pass the notification to the application, which will act on the notification, e.g., by displaying a warning about rain being likely later in the day.

To request delivery of notifications by the operating system, applications can provide information specifying the events or conditions for which notifications are to be delivered to the application. An event or condition can be, for example, that the chance of rain later in the day is greater than 90%. The weather service then uses the event or condition to determine when to send notifications to the application. This request for notification, including the associated event or condition, is referred to as a "subscription." A subscription can be a "local" subscription, in which notifications are generated on the device and delivered to applications executing on the same device. A subscription can also be a "push" subscription, in which notifications are generated on one device, such as a server, and sent to other devices, such as mobile devices. The term "push subscription" refers to the server-initiated "pushing" of the notifications to subscribing devices. The processing performed by the service can be fairly complex. It would be desirable, therefore, to simplify the processing that applications perform to send and receive notifications.

SUMMARY

A notification service is a useful feature of distributed applications, enabling notification messages to be sent in a timely manner from service providers to applications running on users' devices, such as mobile phones, tablet computers, desktop computers, and other types of computing devices. Generating notifications when the requisite conditions occur often involves applications-specific processing performed by a "provider" server that is developed, deployed, and managed by the application's developer. Notably, the development, deployment, and management of the provider server continue to be substantial tasks that can involve significant effort by the developer.

Accordingly, in one or more embodiments, techniques for simplifying the application developer's role in generating push notifications are provided by enabling the developer to create push "subscriptions" that specify conditions under which push notifications are to be generated, and generating the push notifications, in accordance with the conditions, in a generalized provider server. In this way, the developer can simply define the conditions under which push notifications are generated using conditionals that compare data in database records to predefined values whenever a database record is created, updated, or deleted. As there can be thousands of potential recipients and millions of database records, techniques are disclosed for efficiently identifying the recipients to which the push notifications are to be delivered. For example, when a data record is changed, a query is generated to retrieve the subscriptions having conditions that are satisfied by the new value(s) in the data record. The techniques described herein can reduce the number of subscriptions to be processed to a relatively small set, thereby enabling the generalized provider server to generate and send notifications to the subscribing recipients in a timely manner.

BRIEF DESCRIPTION OF THE DRAWINGS

The included drawings are for illustrative purposes and serve only to provide examples of possible structures and arrangements for the disclosed inventive apparatuses and methods for providing portable computing devices. These drawings in no way limit any changes in form and detail that may be made to the invention by one skilled in the art without departing from the spirit and scope of the invention. The embodiments will be readily understood by the following detailed description in conjunction with the accompanying drawings, wherein like reference numerals designate like structural elements, and in which.

DETAILED DESCRIPTION

Figure 1:
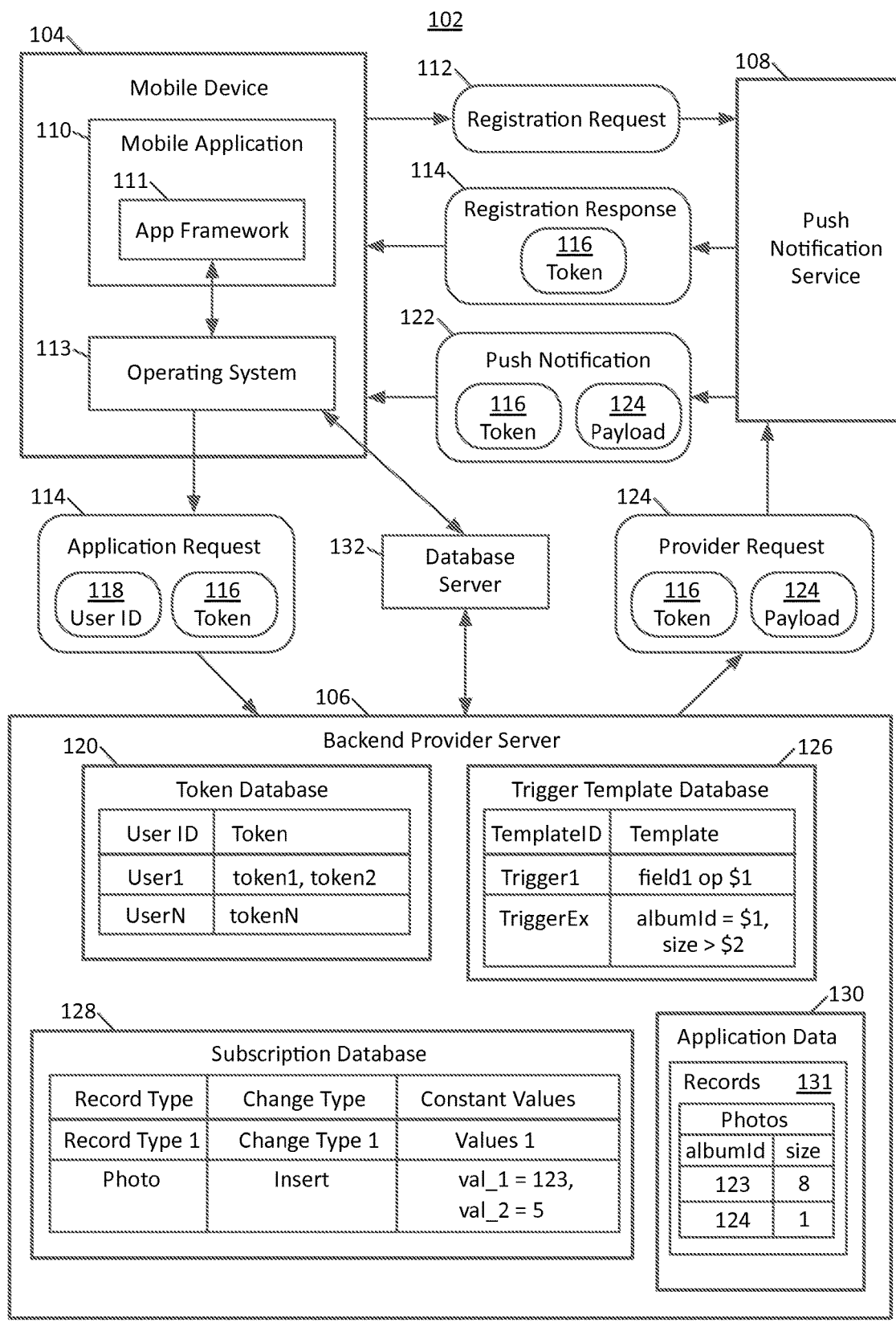
FIG. 1 is an illustrative drawing of a push notification system in accordance with one or more embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The following relates to a portable computing device such as a laptop computer, net book computer, tablet computer, etc. The portable computing device can include a multi-part housing having a top case and a bottom case joining at a reveal to form a base portion. The portable computing device can have an upper portion (or lid) that can house a display screen and other related components whereas the base portion can house various processors, drives, ports, battery, keyboard, touchpad and the like. The base portion can be formed of a multipart housing that can include top and bottom outer housing components each of which can be formed in a particular manner at an interface region such that the gap and offset between these outer housing components are not only reduced, but are also more consistent from device to device during the mass production of devices. These general subjects are set forth in greater detail below.

A notification service is a useful feature of distributed applications, enabling notification messages to be sent in a timely manner from service providers to applications running on users' devices, such as mobile phones, tablet computers, desktop computers, and other types of computing devices. Examples of such notifications include messages about important news items, availability of new products, warnings about unusual or exceptional conditions such as stock market conditions, airline flight delays or severe weather, arrival of text messages and other time-sensitive messages, alerts, or warnings. Because of their time-sensitive nature, notifications can be presented to users even if the associated application is not in use, and should be presented relatively soon after the occurrence of the conditions that causes the notifications. Generating notifications when the requisite conditions occur often involves applications-specific processing performed by a "provider" server that is developed, deployed, and managed by the application's developer. Although the provider server can delegate the tasks of sending the notification to user devices and displaying the notifications on the devices to a general-purpose notification system, such as the Apple® Push Notification Service (APNS), the development, deployment, and management of the provider server are still substantial tasks that can involve significant effort by the developer.

In one or more embodiments, techniques for simplifying the application developer's role in generating push notifications are provided by enabling the developer to create push "subscriptions" that specify conditions under which push notifications are to be generated, and generating the push notifications, in accordance with the conditions, in a generalized provider server. In this way, the developer can simply define the conditions under which push notifications are generated using conditionals that compare data in database records to predefined values whenever a database record is created, updated, or deleted. As there can be thousands of potential recipients and millions of database records, techniques are disclosed for efficiently identifying the recipients to which the push notifications are to be delivered. For example, when a data record is changed, a query is generated to retrieve the subscriptions having conditions that are satisfied by the new value(s) in the data record. The techniques described herein reduce the number of subscriptions to be processed to a relatively small set, thereby enabling the generalized provider server to generate and send notifications to the subscribing recipients in a timely manner.

FIG. 1 is an illustrative drawing of a push notification system in accordance with one or more embodiments. A push notification system 102 can include a mobile device 104, a backend application server referred to herein as a provider server 106, and a notification server 108 (e.g., for an Apple Push Notification Service (APNS)). The mobile device 104 can be, for example, a mobile phone such as iPhone®, a tablet computer such as iPad® (both available from Apple Inc. of Cupertino, Calif.), a laptop computer, or the like. The mobile device 104 executes computer program code that implements the application 110, which, as shown in FIG. 1, includes an application framework 111 that is used by the application 110 to implement portions of the techniques described herein. The mobile device 104 further includes an operating system 113 that is configured to provide an underlying platform on which both the application 110 and the application framework 111 can be executed.

When an application 110 is installed or begins executing on the mobile device 104, the application 110 causes a registration request 112 to be sent to APNS 108 to register for push notifications 122. In turn, APNS 108 generates a push token 116 using information contained in a unique device certificate associated with the mobile device 104. The push token 116 includes an identifier of the mobile device 104 and identifies the application. APNS 108 then encrypts the push token 116 with a token key and send a response, which includes the push token 116, back to the application 110. The push token 116 can be understood as analogous to a phone number; it contains information that enables APNS 108 to locate the mobile device 104 on which the application 110 is installed. The provider server 106 then sends the push token 116 in a provider request message 124 to APNS 108 when requesting that notifications be generated. In one example, provider server 106 communicates with APNS using a binary interface that is asynchronous and uses a streaming Transmission Control Protocol (TCP) socket design for sending push notifications as binary content to APNS 108. APNS 108 then decrypts the push token 116 and validate that the push token 116 was generated for the mobile device 104. To validate the push token 116, APNS 108 checks that the device identifier contained in the push token 116 matches the device identifier in the device certificate.

The application 110 can send an application request 114, which includes a user identifier 118 that identifies a user, and the push token 116, to the provider server 106. The provider server 106 stores that information in a data store such as a token database 120. The provider server 106 uses other databases, such as a trigger template database 126, a subscription database 128, and an application database 130, which are described below. The databases 120, 126 128, 130 and other databases shown in FIG. 1 can be, for example, a NoSQL database such as Cassandra or the like, a Structured Query Language (SQL) database, an in-memory database, or a combination of those. The databases 120, 126, 128, 130 can be stored in separate databases, or can be stored in separate tables in a single database.

The databases 120, 126, 128, 130 can be implemented using a database server 132 that stores data persistently, and can be in-memory representations or caches of portions of the data stored in the database server(s) 132. The token database 120 stores associations between user identifiers 118 and push tokens 116. The application database 130 stores data record according to a data format that can be specified by the application 110. In one example, the provider server 106 monitors the application database 130 and generates notifications in response to modifications of database records 131 stored in the application database 130. The notifications are generated based upon subscriptions defined in a subscription database 128 and trigger templates defined in a trigger template database 126, as described in more detail below.

Once the mobile device 104 has been registered with the notification server 108, the provider server 106 can cause a push notification 122 to be sent to the mobile device 104 by sending a provider request message 124 that includes the push token 116 to the notification server 108 (e.g., APNS). The notification server 108 then performs the actual action of sending the push notification 122 to the mobile device 104. The push notification includes the push token 116 and a provider request message 124, which is, for example, a JSON-defined property list that specifies how the user of an application on a device is to be alerted. The provider request message 124 can contain information about how the system should alert the user, as well as any custom data the provider server 106 provides. The provider request message 124 is described in more detail below. In one implementation, each mobile device 104 establishes an accredited and encrypted network (e.g., Internet Protocol) connection with the notification servers 108, and receives notifications over this persistent connection. Provider servers 106 can communicate with the notification servers 108 through a persistent and secure channel while monitoring incoming data intended for their associated applications 110. When a provider authenticates itself to APNS, it sends its topic to the APNS server, which identifies the application for which it's providing data. The topic is currently the bundle identifier of the target application.

In one or more embodiments, when a new data record is inserted into an application database 130, the provider server 106 detects the change and checks whether any subscription conditions are satisfied (i.e., true) when data values from the data record are substituted into the subscription conditions. For each satisfied subscription condition, the provider server 106 sends a provider request message 124 that includes the push token 116 and the provider request message 124 to the notification server 108. The provider request message 124 can include, for example, an action associated with the subscription, data values from the data record, other data associated with the subscription or data record, and the like.

In one example, the protocol between an application server and APNS 108 is thus extended to send push notifications for multiple apps. An ordinary provider connects to APNS 108 with an SSL or TLS certificate. When that connection is established, the identity of the provider is embedded in that certificate, and the pushes the provider sends can only be sent to clients that match that certificate. The protocol is embedded by using a certificate that has a broad identity, such as com.apple.iCloud. APNS recognizes the broad identity, and allows a recipient identifier to be sent from the provider to cause the push to be sent to that recipient. The recipient can be specified with each push. The recipient identifier specifies which application on the device is to receive the push notification.

Changes to the database records 131 in the application database 130 are referred to herein as data changes. Data changes can include insertion of new records, updates of existing records, and deletions of existing records. The provider server 106 can detect each type of data change, and the subscription conditions can specify the type(s) of data change to which the condition is to apply. Changes to existing database records and deletions of database records from the application database 130 can also be detected by the provider server 106. When new data for the application 110 arrives, e.g., as a result of a database change, the provider server 106 prepares and sends the provider request message 124 through a communication channel to APNS 108, which pushes (i.e., sends) the push notification 122 to the a target mobile device 104.

When developers develop and deploy the provider, they use can SSL certificates supplied by the push notification system vendor. Certificates supplied to third-party developers are ordinarily limited to a single application (identified by a bundle ID), and to either a development environment or a production environment. Each environment has an associated IP address and certificate. Each mobile device 104 establishes an accredited and encrypted IP connection with the notification servers 108, and receives push notifications 122 over the persistent connection. If a push notification 122 for an application 110 arrives when that application is not running, the mobile device 104 alerts the user that the application has data waiting for it. If APNS 108 attempts to deliver a registration request 112, but the mobile device 104 is offline, the registration request 112 is stored for a limited period of time, and delivered to the mobile device 104 when the mobile device 104 becomes available.

In one or more embodiments, to support the security model for APNS, providers and devices possess certain certificates, certificate authority (CA) certificates, or tokens. Each provider server 106 has a unique provider certificate and private cryptographic key for validating their connection with APNS 108. When third party developers implement a provider server, this certificate, provisioned by the vendor that supplies the notification servers 108, identifies a particular topic published by the provider; the topic can be, for example, a bundle identifier of the application 110.

In accordance with embodiments described herein, the provider server 106 has a multi-application provider certificate that has a higher level of trust and enables the provider server 106 to communicate with multiple different applications 110. For each provider request message 124 for a notification, the provider server 106 furnishes APNS 108 with a push token 116 identifying the target mobile device 104.

Although applications can implement providers, doing so is a complicated task. Instead of requiring the application to implement the provider server, the techniques described herein supply a generalized provider that accepts subscription requests from applications. These subscription requests include conditions for sending push notifications. The provider server 106 evaluates the conditions as database records in the application database 130 are changes, and sends requests to APNS 108 to generate a notification for each change that satisfies the condition. That is, applications 110 can define filter conditions in terms of database record fields. When the database records 131 change, the filter condition is evaluated, and, if the condition is true, the provider server 106 causes corresponding push notifications to be sent to the applications 110. The subscription mechanism is a way of enabling users to specify, in client code (as opposed to server side code in a user-supplied provider implementation) the conditions under which a notification is sent, and the details of the notification (e.g., an alert dialog, or backend information that indicates an action to be performed).

As introduced above, in one aspect, a subscription request received from an application 110 (e.g., supplied by an application developer) includes a set of conditions under which a push notification is sent. A subscription can be understood as including a data structure that specifies a trigger, a notification action, and an owner identifier, which can be a user identifier or a host identifier. For example, Subscription=(trigger,notification,owner).

The trigger is a representation of the condition under which notifications are to be generated, and includes a change type and a condition. For example, Trigger=(changeType,condition).

The change type indicates whether the change is an insert, update, deletion, or other type of change. The condition can include a comparison operation between a variable and a value, where the variable corresponds to a database field. For example, the condition "size>3" specifies that a database record named "size" must be greater than three for the condition to be satisfied. The value can be a constant, such as 8742. The comparison operation can be a relational comparison such as <, >, <=, >=, != (not equal), or other operator. A condition can include multiple comparisons, in which case the comparisons all must be true for the condition to be satisfied. In other examples, logical operators such as "or" and "and" can be used to specify conditions that are true when one or all of the comparisons are satisfied, respectively. Other operations can be included as well. Functions of the variable or constant, such as "round(price)" can also be included in the condition.

The notification portion of the subscription specifies details about the notification to be sent. For example, to detect a posting of a comment on a photo on a web site, the user can use a subscription with a trigger specifying that, on insert of a new record with record type Comment and photo ID=8742, a notification is to be sent. Each time a new record is inserted, updated, or deleted in the application database 130, the subscription conditions, i.e., triggers, are evaluated based on the record. If the record matches one of the conditions, then a notification is sent out.

Subscription processing is performed by evaluating triggers and determining which conditions are met, based on current data values stored in a database. Upon finding a condition that is met, the provider server 106 identifies the user that registered the push token 116, looks up the push token 116, and communicates with APNS 108 to cause APNS 108 to send a push notification 122 to the user on the mobile device 104. When the push notification 122 is delivered to the mobile device 104, the user sees a push notification, e.g., a dialog pops up on the device's display. If a user has multiple devices, then each device has associated the user with a device-specific token. The token database 120 maps the user ID to the tokens for each of the user's devices, so whenever a notification is to be delivered to a user, the tokens for the user are retrieved from the database, and the notification is delivered for each of the tokens.

A subscription can send a notification to many users. For example, a shared photo album. The subscription can specify that "whenever a record of type photo is inserted, where the shared album ID is 1," then the users using the shared album ID will all receive pushes when a photo is inserted.

As introduced above, in one or more embodiments, whenever a developer creates a subscription in an iOS® or other type of device, the developer declares a trigger that causes the subscription to fire. The trigger specifies the type of change and the type of record that the subscription applies to. These two pieces of information can be used to eliminate a number of potential triggers, thereby reducing the number of triggers to be evaluated when determining which triggers are satisfied by a particular database change. When the record type and change type of the trigger do match those of the database change, a more specific search is performed to find triggers for which the condition is true based on the corresponding data.

For example, with a shared photo album, a trigger can be defined to specify that a notification should occur when the record type is Photo, the album ID of the Photo record is a specific value being used by the user (e.g., 123), and the resolution of the photo is above a threshold, e.g., the size of the photo is greater than or equal to 5 megabytes. A trigger representing that condition is shown below:

Trigger=(Insert,Photo,albumID=123,size>8).

In one or more embodiments, when a subscription is created in response to an application request 114, the provider server 106 stores information about the subscription and trigger in databases for use in subsequent subscription processing. For each subscription, an entry is created in the subscription database with the record type, change type, and condition associated with the subscription. Furthermore, a trigger template is generated based on the trigger, and stored in the trigger template database 126 in association with a template identifier. The trigger template includes the record type, change type, and a set of unbound filters, which are comparison operations that have the same variable name and operation as the condition, but with a placeholder value in place of the constant value. The trigger template database 126 and the subscription database 128 are used to identify database records 131 in the application database 130 that match the subscriptions and generate corresponding notifications, as described below. In one aspect, each subscription is scoped to a particular application. An application identifier can be stored in the subscription database 128, but is not shown in FIG. 1, for simplicity of description.

Figure 2:
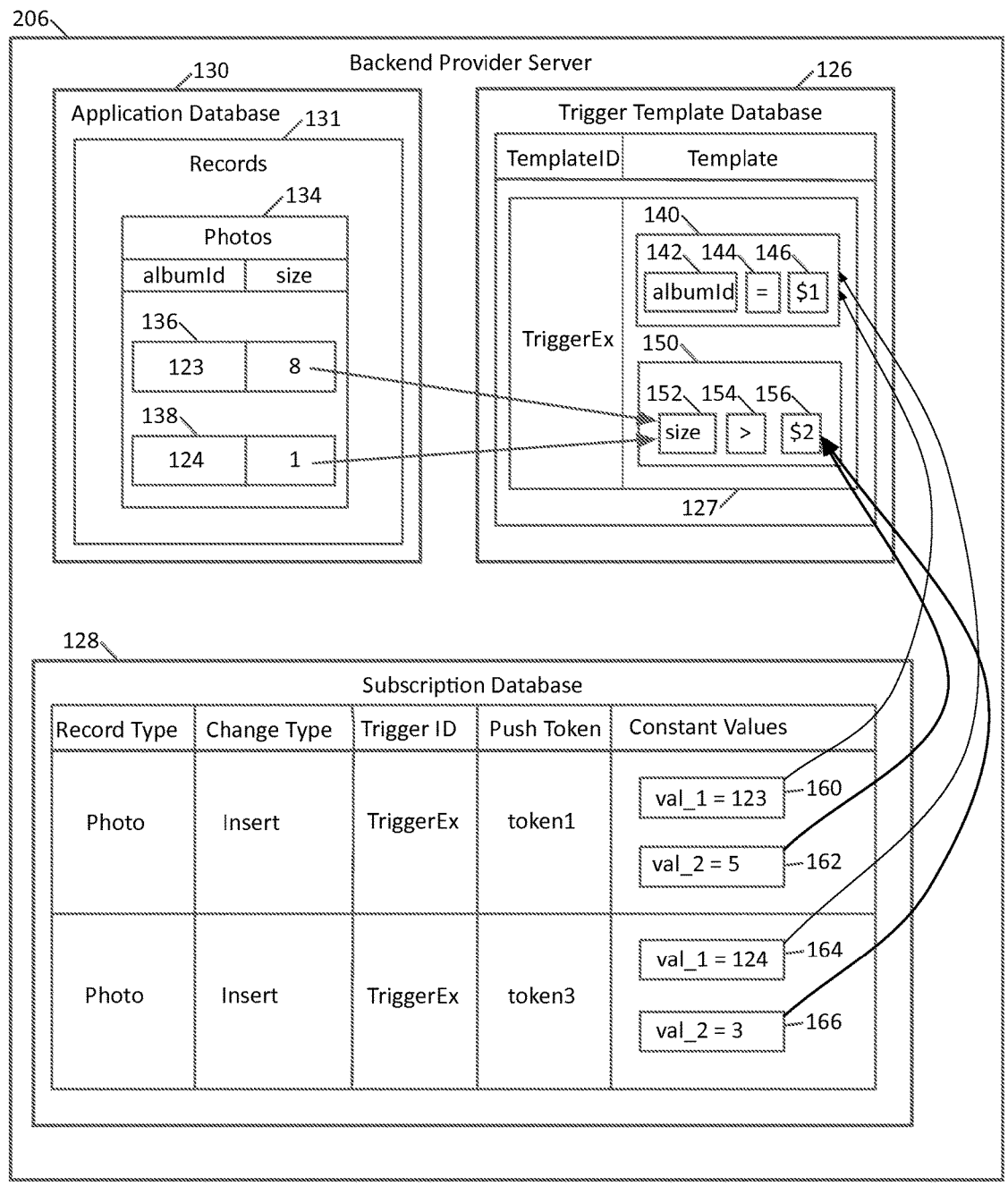
FIG. 2 is an illustrative drawing of a provider server that can be used in a push notification system in accordance with one or more embodiments.

FIG. 2 is an illustrative drawing of a provider server 206 that can be used in a push notification system 102 in accordance with one or more embodiments. In one or more embodiments, the provider server 206 monitors updates, i.e., changes, of the application database 130. When the condition of a subscription is satisfied by the values in a record in the application database 130, the provider server 206 sends a provider request message 124 to APNS 108 requesting that a push notification 122 be generated. To evaluate the subscriptions with actual data, each of the subscription conditions is evaluated against the user data stored in fields of the application database 130 that are referred to by the conditions, such as albumId and size. A trigger can thus be represented as a "trigger template" 127 that specifies a set of conditions with variables, also referred to herein as "placeholders" 146, 156, in place of the actual values supplied when the trigger is defined. For example, an example trigger template 127 having conditions 140, 150 that are true when a data record has an albumId equal to a first value and a size greater than a second value can be represented as follows:

Trigger:(albumId=$1 and size>$2).

When a trigger is evaluated, specific values 160, 162 associated with the user who created the subscription are substituted into the condition for these $1 and $2 variables 146 and 156, respectively. When a subscription that matches this trigger definition is created, a record is created in the subscription database 128 that represents the subscription, with specific values, named val_1 160 and val_2 162, for the placeholders $1 146 and $2 156:

Subscription:(Photo,Insert,val_1=123,val_2=5).

When a subscription is created, but there is no existing trigger template that has conditions corresponding to those of the subscription, a new trigger template can be created by replacing the actual values in the subscription, e.g., 123 and 5, with placeholder values 146, 156. The values val_1 and val_2 are bound to the placeholder variables $1 and $2.

The process of constructing trigger templates 127 thus involves a form of "splitting" of the subscription request into a more generalized representation of the subscription condition supplied when a subscription request is received, and a representation of the specific constant values, which are stored in the subscription database as values 160, 162. The new trigger template 127 is stored in the trigger template database 126 (with the placeholders 146, 156 that correspond to the specific constant values) in association with a distinct template identifier. This separation of the trigger condition from the specific values to which the application database 130 is compared enables the conditions to be stored in one location and re-used by each subscription that uses the same type of condition, even if the particular values in the conditions are different. The entry in the subscription database 128 is linked to the corresponding template trigger by a trigger identifier (Trigger ID) that is associated with each subscription record in the subscription database 128 and refers to the corresponding trigger template 127 in the trigger template database 126. Two subscription records are shown in the subscription database 128. A first subscription record, which has a push token named token1, has constant values val_1=123 and val_2=5. A second subscription record, which has a push token named token 2, has constant values val_1=124 and val_2=3. Both subscription records share a single trigger template 127. The first subscription's condition is albumId=123 and size>5, as can be seen by substituting the constant values val_1=123 160, val_2=5 162 into the trigger placeholders 146, 156, respectively. The second subscription's condition is albumId=124 and size>3, as can be seen by substituting the constant values val_1=124 164 and val_2=3 166.

As described above, since the subscription database 128 specifies the values 123 and 5 for val_1 and val_2, respectively, the values 123 and 5 replace, i.e., are substituted for, the placeholder values $1 and $2, respectively, in the trigger template when subscription processing is performed as described below. The subscription database table can be indexed by these values, e.g., indexes can be created for the Record Type, Change Type, val_1, and val_2 columns. Then, suppose that one or more records of type Photo are created, e.g., in response to photos being uploaded to the user's photo album. Each photo can be stored in the application database 130 as one of the Photo records 134. For example, a photo 136 can be represented by a record having an albumId=123, a size=8 megabytes, a caption, and other attributes. The caption and other attributes are stored in the application database 130, but are not shown in the figures. Another photo 138 can be represented by a record having an albumId=124 and a size=1 megabyte, for example. The application database records can be represented as follows:

Application Data:Photo=(albumId=123,size=8,
      caption="Hey, . . . ")

Application Data:Photo=(albumId=124,size=1)

At this point, triggers have been defined for inserts of database records 131 of type Photo, and each subscription has a specific set of values for the bindings. The provider server 106 detects the insertion of the Photo record shown above into the application database 130. The detection of changes to the application database 130 can be implemented using a database trigger that invokes appropriate program code of the provider server 106 when data is inserted into the application database 130. In response to the insertion of the Photo record, the provider server 106 constructs a query of the subscription database. According to the conditions in the trigger template named TriggerEx, the subscriptions that match the Photo record are those subscriptions having a $1 value (i.e., val_1 binding value)=123 and a $2 value (i.e., val_2 binding value)<=8. Since query conditions are ordinarily written with the variable to the left of the operator and the constant value to the right, the inequality 8>$2 from the template is rewritten as $2<8 for the subsequent query of the subscription database 128. Note that a < in the template is similarly rewritten as a > in the query, but an = remains the same. The subsequent query finds any subscriptions (for the particular record type and change type of the database record 131 in the application data) having conditions that are satisfied by the application data record size field=8. The query is therefore of the following form:

Select subscriptions where Record Type=Photo,
      val_1=123,val_2<8.

This query returns the subscriptions that are satisfied by this new photo that was inserted. Thus, if a matching photo has been created, the album ID of the subscription matches the album ID of the photo, and any subscription having a size less than 8 will match the photo. For example, the photo record matches subscriptions having val_2=5, since 5 is less than 8). Since the subscription database 128 is indexed by the values val_1, val_2, etc., the query is relatively efficient. Note that although both val_1 and val_2 are shown in a single column in the subscription database 128 in FIG. 1, the values can also be stored in separate columns so that an index can be maintained for each value to be substituted into the trigger template. These queries can be used to retrieve the subscriptions that match the criteria defined in the trigger.

Summarizing the example above, the condition "size>5" is converted to the template "size>$1" by replacing the value 3 with the placeholder $1. The placeholder is subsequently replaced with actual values of the database field that is referred to by the variable name. Thus, to determine which subscriptions are matched, for each change (i.e., change) in the application database 130, the placeholder name is replaced with an actual value of the corresponding database field to form a query (subsequent to the update). For example, if a change sets the value of the size field of a database record to 8, and there is a trigger template "size>$1", the subscription database 128 is queried with the reverse query, $1<size, i.e., val_1<8, since $1 corresponds to val_1 (both have the same index number=1) and the size value in the database record 131 is 8.

In one or more embodiments, a two-step process can be used to efficiently identify the subscriptions that are satisfied by a particular database record 131. First, the set of potential subscriptions can be narrowed down by selecting subscriptions that have the same record type and change type as the database record 131. Alternatively, the subscriptions that do not have the same record type and change type as the database record 131 can be removed from the set of subscriptions being considered. Then, the matching subscriptions can be selected from the resulting set by generating and executing a query that matches the binding values of subscriptions in the resulting set of subscriptions to the actual values in the database record 131.

Figure 3:
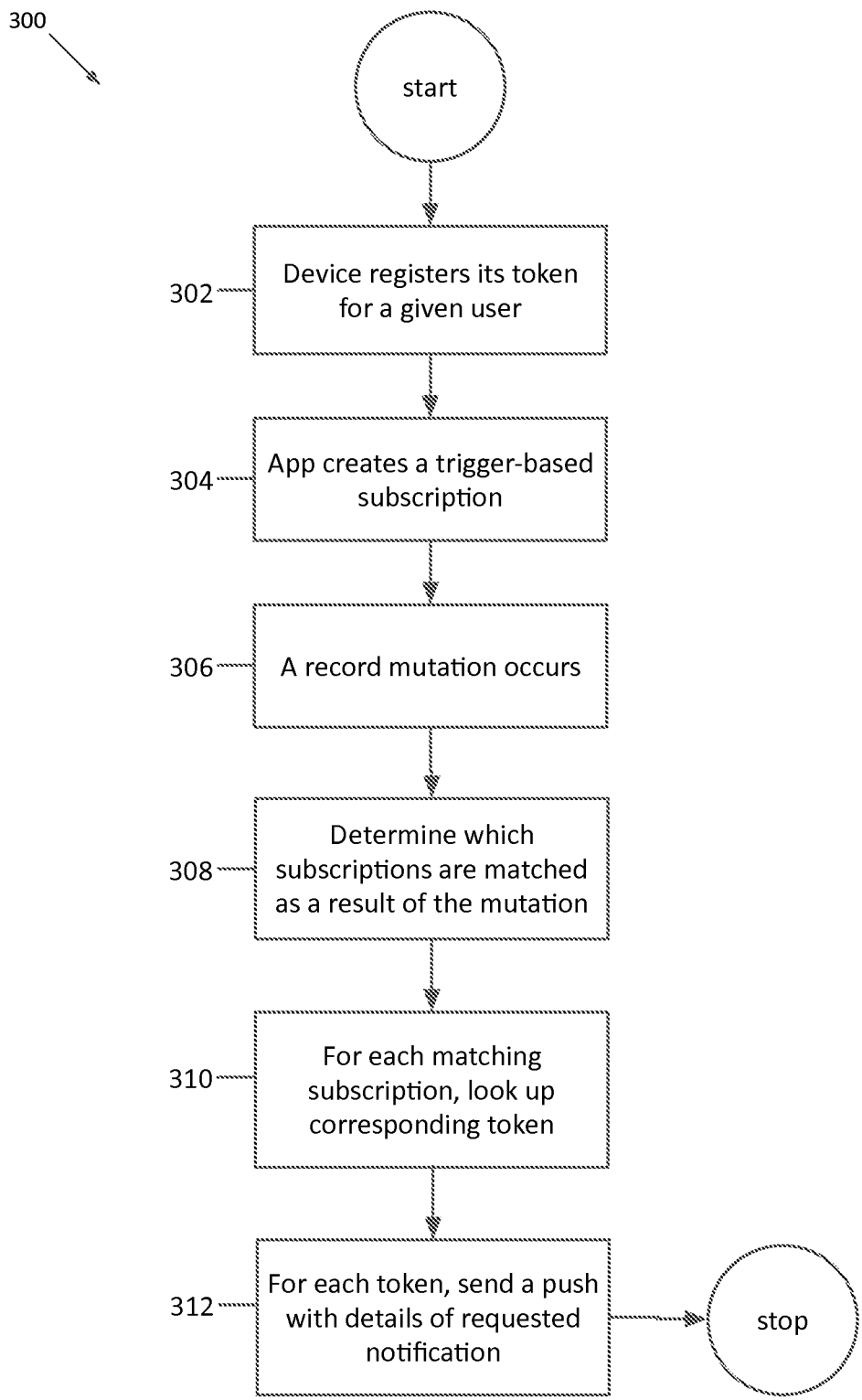
FIG. 3 is an illustrative flowchart of a process for generating and delivering push subscription notifications in accordance with one or more embodiments.

FIG. 3 is an illustrative flowchart of a process for generating and delivering push subscription notifications in accordance with one or more embodiments. Process 300 can be implemented as, for example, computer program code encoded on a computer readable medium and executable by a processor of a computer system. Process 300 begins at block 302 when a device registers its push token for a given user. At block 304, the application creates a trigger-based subscription to receive push notifications according to particular criteria when the user is using the application. The subscription has the following components: an owner, which is the user or device, details of the notification payload, which can be, e.g., alert text, an image to be displayed, and so on, at least one change condition, which specifies whether the trigger is to fire on one or more of an insert, update, or delete, a record type, which is a type associated with each data record in the system, e.g., "photo", a set of conditions (also known as filters), which are predicates of the form <field value> <operation> <specific value>, e.g., albumId, =, 5. The operation can be, for example, =, <=, >=, <, >. At block 306, a record change occurs, i.e. data is inserted, deleted, or updated in the database. Block 306 detects the change, and block 308 evaluates subscriptions. With the changed data, at least one subscription condition may evaluate to true as a result of the record change, in which case a notification is to be generated for the subscription. Block 308 invokes the process shown in FIG. 4 to evaluate the subscriptions and determine which subscriptions are matched by the change.

Figure 4:
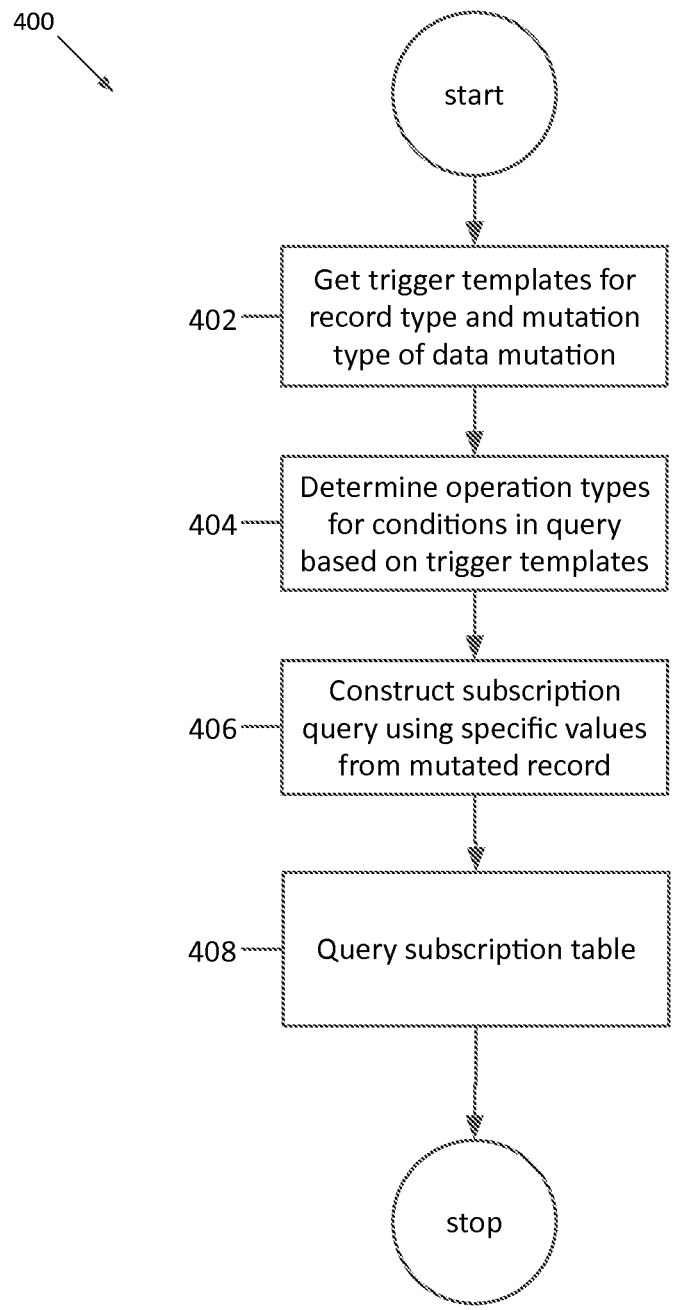
FIG. 4 is an illustrative flowchart of a process for identifying matching push subscriptions in accordance with one or more embodiments.

Upon completion of the process of FIG. 4, the process of FIG. 3 continues execution at block 310. The query at block 308 returns a set of subscription records that have a specific owner and specific payload. For each matching subscription, block 310 looks up the push token 116 that corresponds to the matching subscription, e.g., by retrieving the push token 116 from a field of the subscription database 128 that associates push tokens 116 with the stored subscriptions. At block 312, the provider server generates a provider request message 124 with the push token 116 for each matching subscription, thereby causing a push notification 122 to be sent to the mobile device 104. Since there can be tens or hundreds of millions of subscriptions, for any particular record change, the process of FIG. 3 reduces the number of subscriptions to a small number that are to be notified.

FIG. 4 is an illustrative flowchart of a process for identifying matching push subscriptions in accordance with one or more embodiments. Process 400 can be implemented as, for example, computer program code encoded on a computer readable medium and executable by a processor of a computer system. Process 400 begins at block 402 by generating a trigger template based on the trigger information in the subscription. The trigger template includes the record type, change conditions, and a set of unbound filters (i.e., filters with placeholders instead of specific values). An example of unbound filter is "size<$1" where size is the name of a field in the application database 130. In one example, each application is permitted to have up to a maximum number of trigger templates, e.g., 10 to 100 per application to limit the quantity of resources that an application can consume.

Block 402 gets trigger templates for the record type and change type of the data change. The trigger templates can be retrieved from the trigger template database 126. For example, if the trigger specifies that a push notification is to be sent when photos are inserted into a user's shared album, but a new record of a different type, e.g., user record or comment instead of Photo, was inserted, then the filter will not be satisfied because the record type is different. Similarly, if the change type of the trigger is insert, but a record is deleted, then the trigger will not be satisfied. Block 404 determines operation types for conditions in a query based on the trigger templates.

Block 406 constructs a query using the specific values from the record that was just changed. This query retrieves all of the subscriptions for which specific values of the database records 131 that were changed and match the criteria of the subscription. For example, for the filter "albumId=123 and size>5," a record was inserted with albumId=123 and size=8. A query is thus generated based on the record values. Block 408 queries the subscription database 128 using specific values for the placeholders. For example, a query such as the following can be generated (as described above):

Select results from subscriptions where $1=123 and $2<8.

The query, when executed, returns the subscriptions in which users supplied binding values that are satisfied by the record that was inserted. For example, if a user is interested in photos having a size>5, then the value for the placeholder in size>$2 is $2=5. If a photo having a size=8 is created in the database, then any subscription having a size placeholder ($2) less than 8 matches the photo. As described above, since the condition from the trigger template is reversed when writing the query of the subscription database, the query uses the inverse of the operation in the trigger template.

For example, a subscription can request notification for database records 131 having a size>5. The trigger template has a placeholder size>$2. So a subscription having size>5 is created. A user creates a subscription for size>5. Now, a photo is inserted with size=8. To find the subscriptions that can be matched by a photo with a size of 8, query the subscription database 128 for all subscriptions that substitute a value less than 8 into the trigger template's placeholder $2. The results of the query executed at block 408 are then made available to a process that invoked the process of FIG. 4, e.g., block 308 of FIG. 3.

Figure 5:
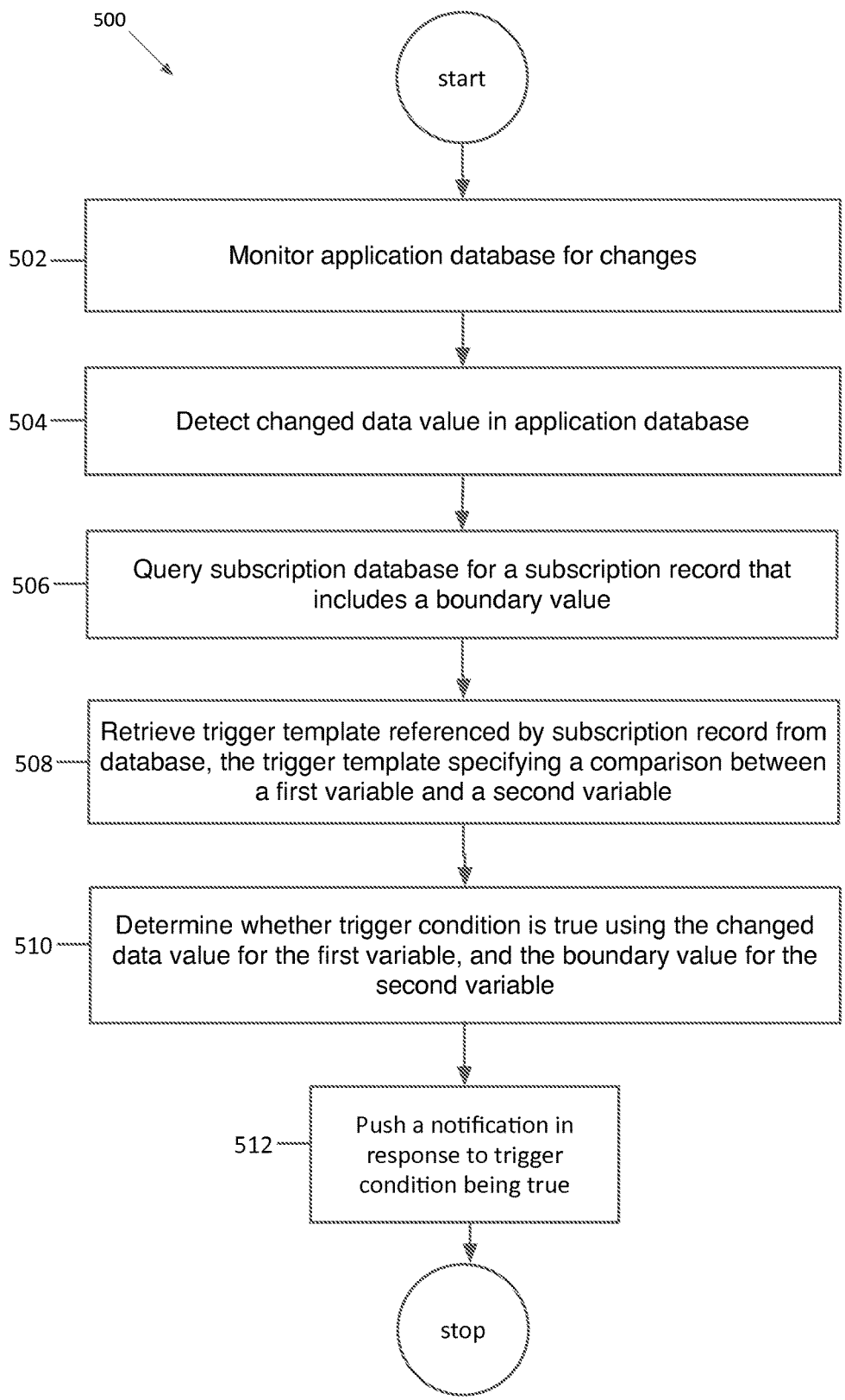
FIG. 5 is an illustrative flowchart of a process for generating and delivering push subscription notifications in accordance with one or more embodiments.

FIG. 5 is an illustrative flowchart of a process for generating and delivering push subscription notifications in accordance with one or more embodiments. Process 500 can be implemented as, for example, computer program code encoded on a computer readable medium and executable by a processor of a computer system such as a server system. Process 500 begins at block 502, which monitors, at a provider server 106, an application database 130, e.g., using database triggers or the like. Block 504 detects at least one changed data value using the monitoring. In response to the detection, block 506 queries a subscription database 128 for a subscription record having at least one boundary value (e.g., a constant value) to be compared to the at least one changed data value from the application database 130. Block 508 retrieves a trigger template referenced by a subscription record that was retrieved by the query of block 506. The comparison is to be performed in accordance with a trigger condition specified in a trigger template 127 associated with the subscription. The trigger template 127 can specify a comparison between a first variable 142/152, such as a name of a database field, corresponding to the changed value, and a second variable 146/156, such as a placeholder corresponding to the at least one constant value. The comparison also includes an operator 144/154, e.g., a relational operator such as <, >, =, !=, or the like. Block 510 determines whether the trigger condition is true using the changed data value in place of the first variable, and the boundary (e.g., constant) value in place of the second variable. Block 512 pushes a notification from the server in response to the trigger condition being true. For example, block 512 can send a request message 124 to a push notification server 108 to cause a push notification 122 to be sent to a mobile device 104.

Figure 6:
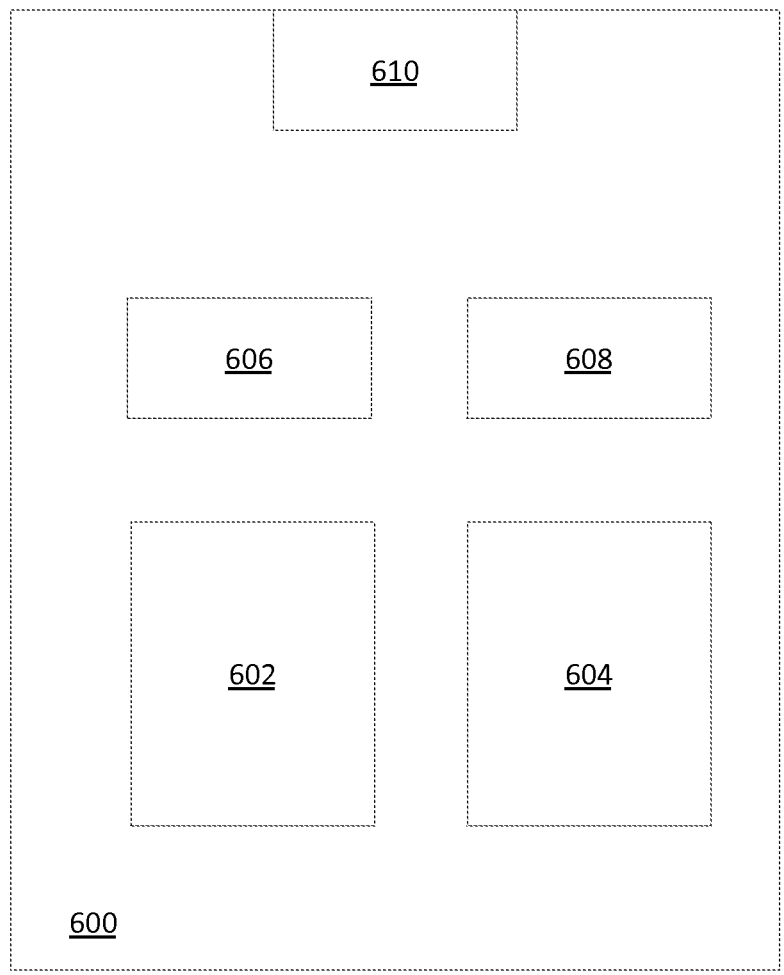
FIG. 6 shows a system block diagram of computer system 600 used to execute the software of an embodiment.

FIG. 6 shows a system block diagram of computer system 600 used to execute the software of an embodiment. Computer system 600 includes subsystems such as a central processor 602, system memory 604, fixed storage 606 (e.g., hard drive), removable storage 608 (e.g., FLASH), and network interface 610. The central processor 602, for example, can execute computer program code (e.g., an operating system) to implement the invention. An operating system is normally, but necessarily) resident in the system memory 604 during its execution. Other computer systems suitable for use with the invention may include additional or fewer subsystems. For example, another computer system could include more than one processor 602 (i.e., a multi-processor system) or a cache memory.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A method for providing client devices with notifications, the method comprising, at a server device:
receiving subscription requests from the client devices, wherein each of the subscription requests includes a constant value and a conditional threshold that are to be associated with respective subscriptions for each of the client devices;
establishing the respective subscriptions for each of the client devices at a database record by forming different trigger conditions for each of the respective subscriptions, wherein at least two or more of the different trigger conditions having different constant values share a single trigger template, and the single trigger template specifies a placeholder variable that is capable of being substituted with the constant value associated with a respective subscription request; and
in response to detecting a change to at least one database value at the database record that results in at least one changed database value:
identifying at least one trigger condition among the different trigger conditions having a change type and a data type that matches a corresponding change type and data type associated with the at least one changed database value,
substituting the placeholder variable specified in the at least one trigger condition with the constant value included in the respective subscription request associated with the at least one changed database value, and
pushing the notifications to one or more client devices having one or more respective subscriptions with the constant value that satisfies the conditional threshold specified in the at least one trigger condition.

2. The method of claim 1, wherein, prior to pushing the notifications to the one or more client devices, the method further comprises:
encrypting the notifications with one or more unique push tokens.

3. The method of claim 2, wherein pushing the notifications to the one or more client devices comprises:
generating payload data based on the at least one changed database value, and
sending the payload data and the one or more unique push tokens associated with the one or more respective subscriptions to a push notification service.

4. The method of claim 1, wherein, in response to determining that there is no existing trigger template having conditions that correspond to respective conditions specified by the respective subscription request, the method further comprises:
generating an additional trigger template that is based on the respective conditions.

5. The method of claim 1, wherein the change type includes an insertion, a deletion, or an update.

6. The method of claim 1, wherein, in response to identifying the at least one trigger condition among the different trigger conditions, the method further comprises:
preventing any other trigger conditions from being further analyzed for a matching change type and data type.

7. The method of claim 1, wherein the at least one trigger condition includes an operator that specifies a type of comparison between the at least one changed database value and the constant value.

8. A non-transitory computer readable medium containing instructions that, when executed by at least one processor of a computing device, cause the computing device to:
receive subscription requests from client devices, wherein each of the subscription requests includes a constant value and a conditional threshold that are to be associated with respective subscriptions for each of the client devices;
establish the respective subscriptions for each of the client devices at a database record by forming different trigger conditions for each of the respective subscriptions, wherein at least two or more of the different trigger conditions having different constant values share a single trigger template, and the single trigger template specifies a placeholder variable that is capable of being substituted with the constant value associated with a respective subscription request; and
in response to detecting a change to at least one database value at the database record that results in at least one changed database value:
identify at least one trigger condition among the different trigger conditions having a change type and a data type that matches a corresponding change type and data type associated with the at least one changed database value,
substitute the placeholder variable specified in the at least one trigger condition with the constant value included in the respective subscription request associated with the at least one changed database value, and
push notifications to one or more client devices having one or more respective subscriptions with the constant value that satisfies the conditional threshold specified in the at least one trigger condition.

9. The non-transitory computer readable medium of claim 8, wherein, prior to pushing the notifications to the one or more client devices, the at least one processor further causes the computing device to:
encrypt the notifications with one or more unique push tokens.

10. The non-transitory computer readable medium of claim 8, wherein the change type includes an insertion, a deletion, or an update.

11. The non-transitory computer readable medium of claim 9, wherein pushing the notifications to the one or more client devices comprises:
generating payload data based on the at least one changed database value, and
sending the payload data and the one or more unique push tokens associated with the one or more respective subscriptions to a push notification service.

12. The non-transitory computer readable medium of claim 8, wherein, in response to determining that there is no existing trigger template having conditions that correspond to respective conditions specified by the respective subscription request, the at least one processor further causes the computing device to:
generate an additional trigger template that is based on the respective conditions.

13. The non-transitory computer readable medium of claim 8, wherein, in response to identifying the at least one trigger condition among the different trigger conditions, the at least one processor further causes the computing device to:
prevent any other trigger conditions from being further analyzed for a matching change type and data type.

14. A system for providing client devices with notifications, the system comprising:
at least one processor; and
at least one memory storing instructions that, when executed by the at least one processor, cause the system to:
receive subscription requests from the client devices, wherein each of the subscription requests includes a constant value and a conditional threshold that are to be associated with respective subscriptions for each of the client devices;
establish the respective subscriptions for each of the client devices at a database record by forming different trigger conditions for each of the respective subscriptions, wherein at least two or more of the different trigger conditions having different constant values share a single trigger template, and the single trigger template specifies a placeholder variable that is capable of being substituted with the constant value associated with a respective subscription request; and
in response to detecting a change to at least one database value at the database record that results in at least one changed database value:
identify at least one trigger condition among the different trigger conditions having a change type and a data type that matches a corresponding change type and data type associated with the at least one database value,
substitute the placeholder variable specified in the at least one trigger condition with the constant value included in the respective subscription request associated with the at least one changed database value, and
push the notifications to one or more client devices having one or more respective subscriptions with the constant value that satisfies the conditional threshold specified in the at least one trigger condition.

15. The system of claim 14, wherein, prior to pushing the notifications to the one or more client devices, the at least one processor further causes the system to:
encrypt the notifications with one or more unique push tokens.

16. The system of claim 15, wherein pushing the notifications to the one or more client devices comprises:
generating payload data based on the at least one changed database value, and
sending the payload data and the one or more unique push tokens associated with the one or more respective subscriptions to a push notification service.

17. The system of claim 14, wherein the one or more respective subscriptions are stored at a subscription database included in the system.

18. The system of claim 14, wherein the change type includes an insertion, a deletion, or an update.

19. The system of claim 14, wherein, in response to identifying the at least one trigger condition among the different trigger conditions, the at least one processor further causes the system to:
prevent any other trigger conditions from being further analyzed for a matching change type and data type.

20. The system of claim 14, wherein the at least one trigger condition includes an operator that specifies a type of comparison between the at least one changed database value and the constant value.

* * * * *